US009110157B2

(12) United States Patent
Levin et al.

(10) Patent No.: US 9,110,157 B2
(45) Date of Patent: Aug. 18, 2015

(54) USING MULTIPLE SOURCES OF LOCATION-AID DATA TO DETERMINE POSITION INFORMATION

(71) Applicant: Intel Corporation, Santa Clara, CA (US)

(72) Inventors: Tirosh Levin, Hadera (IL); Tomer Daniel, Herzlyia (IL)

(73) Assignee: Intel Corporation, Santa Clara, CA (US)

( * ) Notice: Subject to any disclaimer, the term of this patent is extended or adjusted under 35 U.S.C. 154(b) by 95 days.

(21) Appl. No.: 13/797,599

(22) Filed: Mar. 12, 2013

(65) Prior Publication Data

US 2014/0278077 A1   Sep. 18, 2014

(51) Int. Cl.

| | |
|---|---|
| *G01S 19/01* | (2010.01) |
| *G01S 19/12* | (2010.01) |
| *G01S 19/05* | (2010.01) |
| *G01S 19/45* | (2010.01) |
| *H04W 4/02* | (2009.01) |
| *G01S 19/11* | (2010.01) |

(Continued)

(52) U.S. Cl.
CPC ................ *G01S 19/05* (2013.01); *G01S 5/009* (2013.01); *G01S 5/0009* (2013.01); *G01S 5/0236* (2013.01); *G01S 19/06* (2013.01); *G01S 19/11* (2013.01); *G01S 19/12* (2013.01); *G01S 19/45* (2013.01); *H04W 4/025* (2013.01); *H04W 4/028* (2013.01); *H04W 64/003* (2013.01);

(Continued)

(58) Field of Classification Search
CPC ........... G01S 19/12; G01S 1/00; G01S 19/05; G01S 19/11; G01S 19/06; G01S 19/45; G01S 5/0009; G01S 5/009; G01S 5/0236; H04W 64/00; H04W 64/003; H04W 4/025; H04W 4/028; G01C 21/005; H04B 7/18513

USPC ............ 701/300, 468, 469, 483; 342/357.25, 342/357.42, 357.47, 357.49; 455/456.1
See application file for complete search history.

(56) References Cited

U.S. PATENT DOCUMENTS 6,429,808 B1 *  8/2002  King et al. ............... 342/357.44
7,064,706 B2 *  6/2006  King et al. ............... 342/357.44

(Continued)

FOREIGN PATENT DOCUMENTS

JP   2011137799   7/2011

OTHER PUBLICATIONS

International Search Report and Written Opinion, PCT/ISA/210, PCT/ISA/220, PCT/ISA/237, mail date Apr. 28, 2014.

*Primary Examiner* — Russell Frejd
(74) *Attorney, Agent, or Firm* — Pillsbury Winthrop Shaw Puttman LLP

(57) ABSTRACT

A wireless location/position computation system, device, and method are directed to multiple aid-data sources each providing location-related aid information, a wireless device configured to communicate with the aid-data sources, and a location computation module either integrated with or external to the wireless device. The wireless device may include a transceiver to communicate wireless, data and other signals. The wireless device may receive a position request to compute a position of the wireless device, and in response, initiate a compute-position session. In the compute-position session, the wireless device sends aid requests to and retrieves the location-related aid information from the aid-data sources and processes the location-related aid information from the aid-data sources to generate integrated location information. The location computation module may compute the position of the wireless device based on the integrated location information and satellite location information received from a satellite.

24 Claims, 2 Drawing Sheets

(51) Int. Cl.
    *G01S 5/00* (2006.01)
    *G01S 19/06* (2010.01)
    *G01S 5/02* (2010.01)
    *G01C 21/00* (2006.01)
    *H04W 64/00* (2009.01)
    *G01S 1/00* (2006.01)
    *H04B 7/185* (2006.01)

(52) U.S. Cl.
    CPC ............ *G01C 21/005* (2013.01); *G01S 1/00* (2013.01); *H04B 7/18513* (2013.01); *H04W 64/00* (2013.01)

(56) References Cited

U.S. PATENT DOCUMENTS

| | | | |
|---|---|---|---|
| 7,747,257 B2 * | 6/2010 | Zhao et al. | 455/456.1 |
| 7,786,931 B2 * | 8/2010 | Monnerat et al. | 342/357.64 |
| 2006/0038719 A1 | 2/2006 | Pande et al. | |
| 2010/0194634 A1 | 8/2010 | Biacs et al. | |
| 2011/0223934 A1 | 9/2011 | Pande et al. | |
| 2012/0001797 A1 * | 1/2012 | Ling | 342/357.42 |
| 2012/0115508 A1 | 5/2012 | Moeglein et al. | |
| 2012/0252501 A1 * | 10/2012 | Smith et al. | 455/456.5 |
| 2013/0040653 A1 * | 2/2013 | Czompo et al. | 455/456.1 |

\* cited by examiner

FLOW CHART 1 POSITION REQUEST WITH THE RETRIEVAL OF ASSISTANCE DATA

USING MULTIPLE SOURCES OF LOCATION-AID DATA TO DETERMINE POSITION INFORMATION

TECHNICAL FIELD

This disclosure relates generally to the field of wireless communications, and in particular, to wireless location/positioning techniques.

BACKGROUND

In an assisted-global positioning system (A-GPS) or assisted-global navigation satellite system (A-GNSS), a GPS receiver, when operational in a particular wireless network, receives and uses location-related assistance data to improve its performance, e.g., in terms of time-to-first-fix (TTFF) value and position accuracy. But typically, in such systems, the GPS receiver (e.g., a GPS-capable cellular device) is able to request for and retrieve location-related assistance data from only a location-information source in the wireless network where the device is operational.

Even if multiple sources or servers storing location-related assistance data are available to or accessible by the GPS receiver/device, it may be restricted to choose only one of the sources to receive the assistance data. Moreover, assistance data from two different sources may be incompatible or unsynchronized, such that they are not usable by the device to compute the position/location. For example, one source in the wireless network may provide proprietary information of the network, such as network time, position, etc., as assistance data. And, another source (e.g., a location server in the same or different network) may provide assistance data including data related to a satellite constellation selected by the network. In such a case, the device may not be able to utilize the two sets of dissimilar data, and may have to select one of the two sets for computing the position of the device.

In another example, the device may be a cellular device capable to connecting to different cellular networks, e.g., networks of different cellular operators (AT&T, Verizon, etc.), or networks implemented with different cellular technologies (e.g., 3G, 4G (WiMAX, LTE), etc.). In case the device transitions its connectivity from one network to another (e.g., due to roaming, simultaneously connecting on two different data networks, or voluntarily switching from one network to another), in current assisted-positioning systems, the device has to terminate its current position-computation session which may be using assistance data from the previous network, discard the previous assistance data, and initiate a new position-computation session in the new network, and request and use new assistance data. Thus, the device lacks the opportunity to use assistance data from multiple location-information sources (e.g., by integrating previous and new assistance data) to further improve its performance.

DETAILED DESCRIPTION

Figure 1:
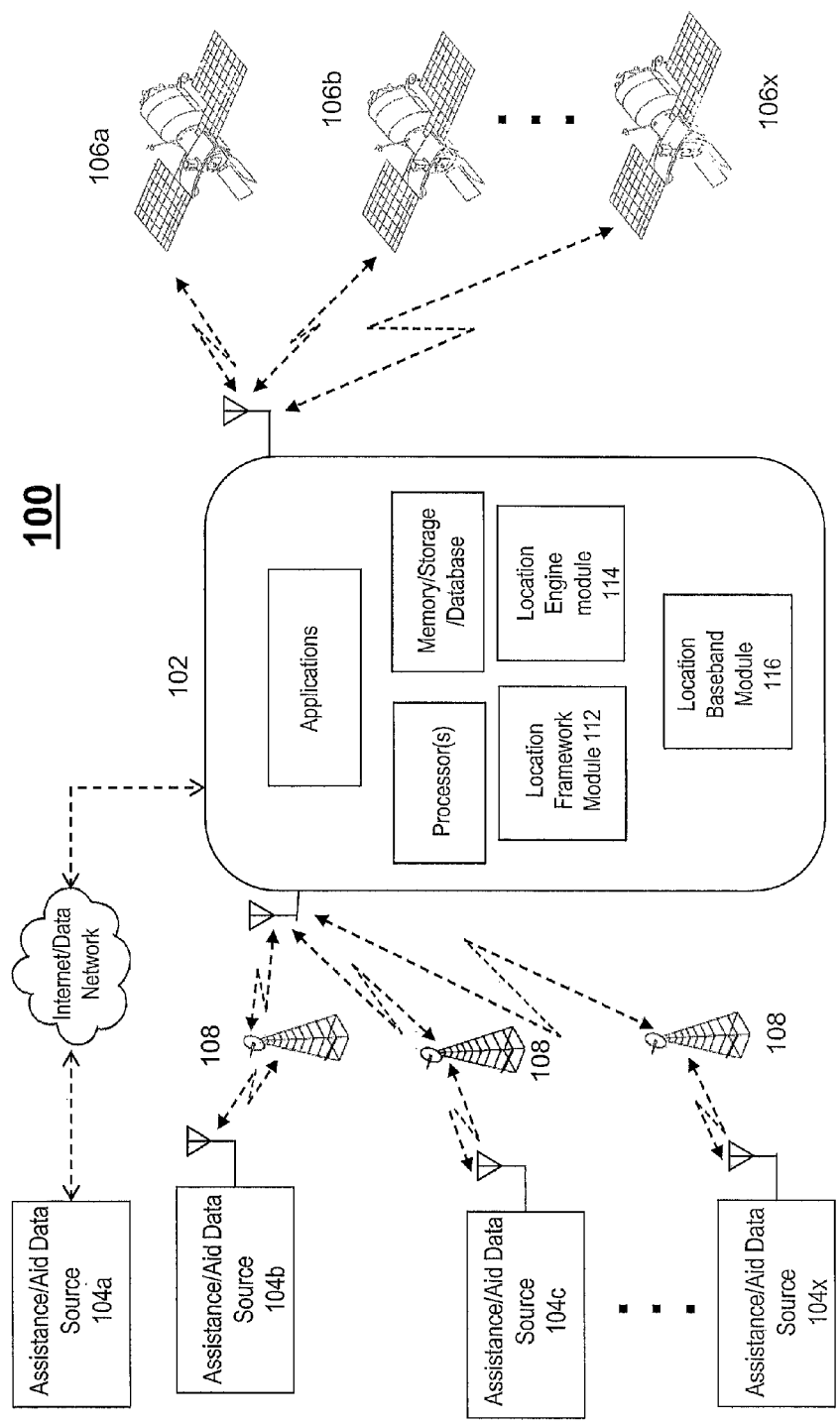
FIG. 1 depicts an overview of a location/position information system, in accordance with various aspects and principles of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, what is proposed is a wireless location/position computation system that includes multiple aid-data sources each storing (and providing) location-related aid information, a wireless device configured to communicate with the aid-data sources, and a location computation module either integrated with or external to the wireless device. The wireless device may include one or more transceivers and other necessary circuitry to communicate and process wireless, data and other signals. The wireless device may receive a position request to compute a position of the wireless device, and in response, initiate a compute-position session. In the compute-position session, the wireless device sends aid requests to and retrieves the location-related aid information from the aid-data sources and processes the location-related aid information from the aid-data sources to generate integrated location information. The location computation module may compute the position of the wireless device based on the integrated location information and satellite location information received from a satellite.

In some embodiments, the aid-data sources include network location servers associated with a plurality of cellular networks, wherein each network location server stores the location-related aid information generated or processed within a corresponding cellular network, one or more Internet-based location service provider servers, or a combination thereof.

The location-related aid information may include reference (or coarse or raw) location/position information, reference (or coarse or raw) time information, orbital information (e.g., ephemeris data) of a satellite, reference and status information (e.g., the almanac) of a set of satellites, or a combination thereof. In some embodiments, to process the location-related aid information, the wireless device is configured to perform one or more of the following operations: (a) perform a mathematical operation on the reference location information or the reference time information from at least two of the aid-data sources, (b) append the orbital information of a satellite from one of the aid-data sources with the orbital information of a satellite from another of the aid-data sources, (c) select the location-related aid information received first or last at the wireless device from one of the aid-data sources as the integrated location information, and (d) convert the orbital information of a satellite or the reference and status information of a set of satellites from a first format to a second format, or vice-versa, wherein the first format corresponds to computation of the position of the wireless device by the location computation module integrated within the wireless device, and the second format corresponds to computation of the position of the wireless device by the location computation module external to the wireless device.

In some embodiments, the system further includes a first wireless network including a first aid-data source, and a second wireless network including a second aid-data source. In this case, the wireless device may be first operational in the first wireless network, and as part of the compute-position session, the wireless devices may retrieve the location-related aid information from the first aid-data source. At a later time, the wireless device may be disconnected from the first wireless network and become operational in the second wireless network (e.g., based on the cellular roaming mode), or in addition to being connected with and operational in the first wireless network, may also connect with the second wireless network. While operational in the second network, and as part of and without terminating the (current) compute-position session, the wireless device may retrieve the location-related aid information from the second aid-data source. Still without terminating the (current) compute-position session, the wireless device may combine the location-related aid information from the first and second aid-data sources. Also, within the same compute-position session, the location computation module may compute the position of the wireless device based on the combined location-related aid information and satellite location information.

In another aspect of this disclosure, a wireless device is presented which may include a transceiver and a location core module having or associated with a processor. The transceiver may be arranged to transmit and receive wireless, data and other signals. The location core module may be configured to receive a position request to compute a position of the wireless device, and responsive to the position request, initiate a compute-position session. In the compute-position session, the location core module (or its processor) may be configured to send aid requests to and retrieve the location-related aid information from a plurality of aid-data sources. The location core module may also process the location-related aid information received from the plurality of aid-data sources to generate integrated location information. Further, the location core module may either compute the position of the wireless device based on the integrated location information and satellite location information received from a satellite, or provide the integrated location information and/or the satellite location information to a location computation module external to the wireless device to compute the position of the wireless device.

In some embodiments, the location core module includes a location framework module, a location engine module and a location baseband module. The location framework module may be arranged to receive the position request (e.g., from an application executing on the wireless device, or from a device separate from the wireless device), and communicate with the plurality of aid-data sources to retrieve the location-related aid information. The location engine module may be configured to send a request to the location framework module to communicate with the plurality of aid-data sources to retrieve the location-related aid information, and receive the location-related aid information from the location framework module. The location engine module may be further configured to generate and provide configuration information to the location baseband module, and process the integrated location information and the satellite location information. The location baseband module may be configured to track and acquire a satellite based on the configuration information, receive the satellite location information and provide the satellite location information to the location engine module.

In some embodiments, as part of and without terminating the (current) compute-position session, the location engine module is further configured to generate and provide first configuration information to the location baseband module based on the location-related aid information received from a first of the plurality of aid-data sources. The location engine module may further be able to combine the location-related aid information received from the first of the plurality of aid-data sources with the location-related aid information received from a second of the plurality of aid-data sources. The location engine module may then use the combined location-related aid information to generate and provide second configuration information to the location baseband module.

In some embodiments, as part of and without terminating the (current) compute-position session, the location baseband module is further configured to track and acquire a satellite, and initiate generation of a location report based on the first configuration information from the location engine. And, in response to the second configuration information, the location baseband module may update tracking and acquiring of a satellite, and the location report.

In another aspect of this disclosure, a method is presented to compute a position of a wireless device. The method, which may be performed by a processor of the wireless device, includes receiving a position request to compute a position of the wireless device, and in response to the position request, initiating a compute-position session. The compute-position session may include sending aid requests to a plurality of aid-data sources to retrieve location-related aid information from the plurality of aid-data sources, and receiving the requested location-related aid information. The method may further include processing the location-related aid information from the plurality of aid-data sources to generate integrated location information. Further, as part of the compute-position session, the position of the wireless device may be computed at the wireless device based on the integrated location information and satellite location information received from a satellite. Alternatively (or additionally) the integrated location information and/or the satellite location information may be provided from the wireless device to a location computation module external to the wireless device which may compute the position of the wireless device.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

FIG. 1 depicts an overview of wireless positioning system 100, in accordance with various aspects and principles of the present disclosure. The architecture of wireless positioning system 100 includes a wireless device 102, and a plurality of assistance/aid-data sources 104a-104x ("sources 104") storing location-related assistance/aid information that are configured to communicate with device 102 using radio-frequency (RF) signals or via a data network, e.g., an Internet Protocol (IP)-based network such as the Internet. In some embodiments, as is discussed in detail below, one or more sources 104a-104x may be part of and deployed within one or more cellular networks which provide location-based services to their subscribers/users using data from the aid-data sources. Additionally, in system 100, device 102 and sources 104a-104x may be able to communicate with a GPS satellite or a constellation of GPS satellites 106a-106x ("satellite 106") to receive RF signals having position/location-related information, based on which device 102 may be able to compute its position (e.g., for a location-based service and application), as needed. In general, system 100, its components and the location-based services and applications executed therein may be relate to global-navigation-satellite-systems and global positioning systems, e.g., GNSS, GPS, GLONASS, Galileo, COMPASS, BEIDOU, etc., assistance-based satellite/positioning systems, e.g., secure user plane location (SUPL) systems, and/or different augmentation systems, e.g., satellite-based augmentation system (SBAS), etc.

In the context of this disclosure, sources 104 refers to any device or apparatus that is capable of storing and providing (to wireless devices) location-and-time-related information of an associated (cellular) network and/or one or more satellites (e.g., ephemeris information of satellite(s) 106). In some embodiments, a source 104 may be a part of and deployed within a wireless network (e.g., a Global System for Mobile Communications (GSM) network, a General packet radio service (GPRS) network, a third-generation (3G) network, a fourth-generation (4G) network including an Long-Term-Evolution (LTE) network or a WiMAX network, a Wi-Fi network, or any other cellular/wireless network) which provides location-based services to their subscribers/users using assistance data from source 104 and satellite(s) 106. As such, source 104 may be implemented as an assisted-GPS (A-GPS) or assisted-GNSS (A-GNSS) server (hereinafter referred to as "A-GPS server") in the cellular network which receives, monitors, processes and stores the GPS signals from satellites 106 through a reference GPS receiver (not shown) integrated with the A-GPS server.

In some embodiments, the A-GPS server supports one or more base stations or mobile switching center (MSC) 108 of the network (e.g., the A-GPS server might be co-located with the MSC). Based on the implementation, the A-GPS server may be a part of the cellular base station or MSC, or may be arranged as part of an access point (AP) of a Wi-Fi network. Further, the A-GPS server (and in general, sources 104) may be configured to communicate with network entities and/or wireless devices 102 based on the wireless protocols and technologies (e.g., GSM, GPRS, 3G, 4G, Wi-Fi, etc.) supported by the network of which the A-GPS server is a part, and communicate with satellites 106 based on the positioning protocols supported by the GPS satellite system. Regardless of the corresponding wireless network technologies employed, sources 104 will include antenna(s), radio-frequency transmitter(s)/receiver(s), processor(s), router functionality, storage/memory devices and any other components suitable for communication purposes consistent with the related wireless technologies. In some embodiments, instead of being implemented as an A-GPS server with a GPS receiver, source 104 may be a server configured to (wirelessly or via a wired connection) obtain the necessary GPS assistance data from one or more A-GPS servers deployed outside the wireless network of which source 104 is a part. In some other embodiments, instead of being a part of a cellular network, source 104 is an independent A-GPS server which is configured to communicate with device 102 via a wired or wireless Internet Protocol (IP)-based network, e.g., the Internet, e.g., to provide location-related assistance data.

The A-GPS server may have accurate knowledge of the GPS signals being transmitted by satellites 106. Through its connection with the MSC, the A-GPS server may know the cell and sector where the wireless device 102 is located (which may define the device's position to within a couple of kilometers (km) or so). As the A-GPS, source 104 may perform multiple functions including (a) interface with the network entities that will request and/or consume location data (e.g., a base station or MSC), (b) provide the assistance/aid location-related data to the mobile device (e.g., device 102) operational in the network based on which the device may compute its position and time, and/or communicate with satellites 106 for GPS data signals, (c) responsive to a request from the device, calculate the location of the device currently associated with the network (if such calculation is not done by the device itself, e.g., in mobile station assisted (MSA) mode of A-GPS systems), (d) interface to wireless network entities that may help the server to improve the assistance data, and/or other functions related to location-based services or applications.

In some embodiments, the location-related assistance information stored in and provided by sources 104 include reference (or coarse or raw) location information, reference (or coarse or raw) time information based on the network time, GPS date and time information, orbital information (e.g., ephemeris data) of a satellite, reference and status information (e.g., almanac—orbital location and pseudorandom binary sequence (PN or PRN codes) of a set of satellites, Ionospheric parameters, or a combination thereof.

In the context of this disclosure, device 102 refers to any device that may communicate with other devices via wireless signals, and may wirelessly (or via a wired network) connect to and communicate with multiple sources 104 at the same time. Such devices may include a positioning device (e.g., having a GPS receiver) implemented as or within, e.g., a laptop, mobile device, cellular/smartphone, gaming device, tablet computer, a wireless-enabled patient monitoring device, personal communication system (PCS) device, personal digital assistant (PDA), personal audio device (PAD), portable navigational device, and/or any other electronic wireless-enabled device configured to receive a wireless signal including location-related signals. As such, device 102 may be configured with variety of components, such as, for example, processor(s), memories, display screen, camera, input devices as well as communication-based elements. The communication-based elements may include, for example, antenna, interfaces, transceivers, modulation/demodulation and other circuitry, configured to communicate and transmit/receive information via a wireless or wired connection. The communication-based elements may be configured to support various network technologies and protocols including, but not limited to, GSM, GPRS, CDMA, WCDMA, 3G, 4G (LTE or WiMAX), Bluetooth, positioning/navigational (GPS) technologies, Wi-Fi, Ethernet, near-field communication (NFC), and/or other network technologies and protocols. Device 102 may also include a bus infrastructure and/or other interconnection means to connect and communicate information between various components and communication elements noted above.

The processor(s) of device 102 (and sources 104 and other system components) may be part of a core processing or computing unit that is configured to receive and process input data and instructions, provide output and/or control other components of device 102 in accordance with embodiments of the present disclosure. Such processing elements may include a microprocessor, a memory controller, a memory and other components. The microprocessor may further include a cache memory (e.g., SRAM), which along with the memory may be part of a memory hierarchy to store instructions and data. The microprocessor may also include one or more logic modules such as a field programmable gate array (FPGA) or other logic array.

The memories of device 102 (and sources 104 and other components of system 100) may take the form of a dynamic storage device coupled to the bus infrastructure and configured to store information, instructions, and application programs to be executed by the processor(s) or controller(s) associated of the respective device/component. Some or all of the memory may be implemented as Dual In-line Memory Modules (DIMMs), and may be one or more of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ES-DRAM), SyncLink DRAM (SLDRAM), Direct Rambus DRAM (DRDRAM), Ferroelectric RAM (FRAM), or any other type of memory device. Device 102 (and/or other system components) may also include read only memory (ROM) and/or other static storage devices coupled to the bus infrastructure and configured to store static information and instructions for the processor(s) and/or controller(s) associated with the device/component.

In some embodiments, device 102 may support applications (executing of the device itself or on other connected devices) that may require and use location/position of device 102. As such, device 102 may be configured to receive a position request from such an application, process the request, compute the device position, and provide the position information to the application. In some embodiments, to process the position request and determine the position, device 102 communicates with multiple sources 104 (e.g., A-GPS servers) to obtain location-related assistance data. Device 102 may then utilize the assistance data from the multiple sources to improve the tracking and acquiring of satellite(s) 106 to obtain accurate satellite signals needed for the position calculation. Using the assistance data from multiple sources, device 102 may be able to improve its performance in determining the requested position information in terms of: (a) reduced time delay to acquire satellite signals and navigation data and compute the position fix (also known as time-to-first-fix (TTFF)), (b) more accurate position information calculated based on the assistance data and satellite data, (c) better sensitivity to acquire satellite signals in "noisy" conditions, and/or (d) acquiring satellite signals and navigation data from additional satellites, etc.

In some embodiments, as part of an A-GPS or A-GNSS system (i.e., utilizing location-related assistance data from sources 104), device 102 is configured to operate in (one or both of) two modes: Mobile Station-Assisted (MSA) mode, and Mobile Station-Based (MSB) mode. In MSA mode operation, device 102 receives assistance data including ephemeris data, acquisition assistance, reference time, reference frequency, expected satellite Doppler and Doppler rate, and other optional assistance data from an A-GPS server 104. With the help of the assistance data, device 102 receives signals from the visible satellites 106, and sends the measurements to the A-GPS server. The A-GPS server, using, e.g., a location computation module implemented therein, calculates the position and sends it back to device 102. In MSB mode operation, device 102 receives assistance data including ephemeris data, almanac, reference location, reference time and other optional assistance data from an A-GPS server 104. Using the assistance data, device 102 receives signals from the visible satellites 106, and calculates the position (e.g., using a location computation module implemented within device 102). Regardless of the operation mode, in the context of this disclosure, the position of the device is calculated using satellite navigation data and assistance data based on position-computation techniques related to GPS, GNSS or other positioning technologies/protocols, which are well-understood by a person of the ordinary skill in the art.

In some embodiments, device 102 is able to combine the A-GPS-based information and information from other location services, such as, e.g., Wi-Fi Positioning System and cell-site multilateration, to determine the position of the device. Further, in addition to or instead of assisted modes, device 102 may also be arranged to operate as a standalone positioning device that does not utilize location assistance data, and communicate only with associated satellites to obtain positioning or navigation data.

As depicted in FIG. 1, in some embodiments, device 102 also includes a location framework module 112, a location engine module 114 and a location baseband module 116 (which may collectively constitute a "location core"). Location framework module 112 may be configured to receive a position request, e.g., from an application executing on device 102 or on another device, and interface and communicate with sources 104 to retrieve the location-related assistance data.

Location engine module 114 may be configured to perform multiple functions including, but not limited to: (a) sending a request to location framework module 112 to communicate with sources 104 to retrieve the location-related assistance data; (b) receiving the location-related assistance data from location framework module 112; (c) processing the location-related assistance data from sources 104 to generate integrated location information; (d) generating and providing configuration information to location baseband module 116; (e) processing the integrated location information and satellite location measurement and navigation data (from module 116); and (f) computing the position of device 102 based on the integrated location information and/or the satellite location and navigation data.

Location baseband module 116 may be configured to track and acquire a satellite based on the configuration information received from module 114, receive the satellite location measurement and navigation data, and provide that data to location engine module 114 for further processing.

Figure 2:
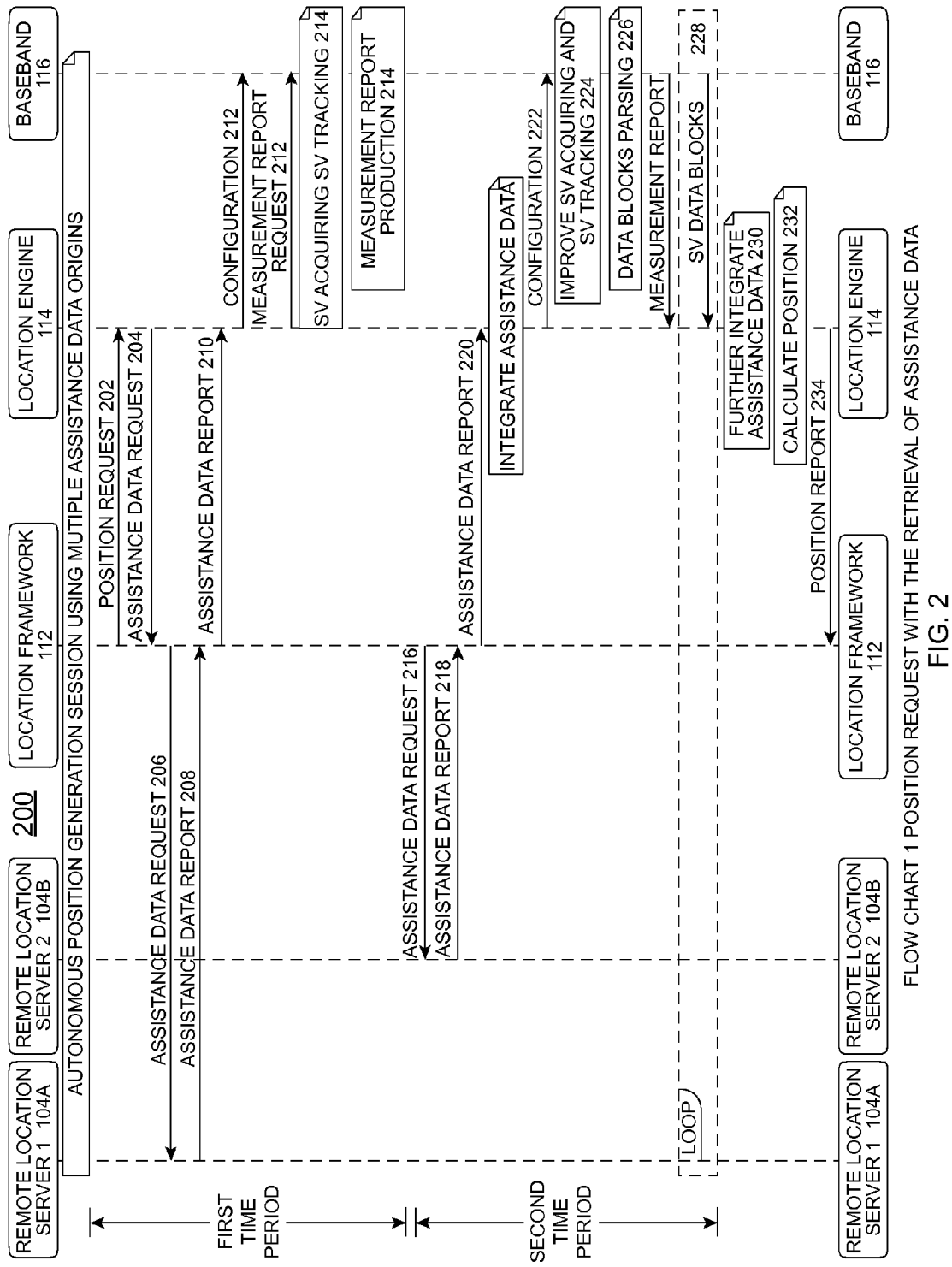
FIG. 2 depicts a message flow diagram illustrating an exemplary process for computing location/position information, in accordance with various aspects and principles of the present disclosure.

The operations of the modules of device 102 for computing position information of device 102 will now be described in relation with FIG. 2 which depicts a message flow diagram illustrating process 200, in accordance with various aspects and principles of the present disclosure. Process 200 is represented as a transactional message flow diagram illustrating transactional messages between the above-discussed components of system 100.

In operation, initially, location framework module 112 may receive a position request to compute a position of device 102, e.g., from an application (e.g., a navigation application) executing on device 102 or a wireless device separate from, but operationally connected with, device 102. Responsive to the position request, location framework module 112 initiates a compute-position session. As part of the compute-position session, first in operation 202, location framework module 112 sends the position request to location engine 114.

Upon receipt of the request, location engine 114 may determine that the existing location-related information (e.g., satellite data) stored in a database or memory at device 102 is not sufficient or updated to track and acquire a satellite 106 and/or compute the position of device 102. As such, in operation 204, location engine 114 sends an assistance data request to location framework module 112 to obtain location-related assistance data from sources 104 (e.g., sources 104a, 104b). Although only two sources 104 are depicted in FIG. 2, process 200 (or system 100) is not limited to only two sources 104. Indeed, any number of multiple sources 104 may be part of system 100 and participate in process 200.

To comply with the assistance data request from location engine 114, location framework module 112, in operation 206, further sends an assistance data request to one of the assistance data sources, e.g., source/server 104a. In response to the request, location framework module 112, in operation 208, receives the assistance data in an assistance data report from source 104a. As discussed above, the assistance data may include location-related information which is used, e.g., by location engine module 114 and a location baseband module 116 to acquire and receive satellite data from satellite(s) 106. In some embodiments, the assistance data include one or more of reference (or coarse or raw) location information, reference (or coarse or raw) time information based on the network time, GPS date and time information, ephemeris data of a satellite, almanac, Ionospheric parameters. Further, to complete the request of operation 204, in operation 210, location framework module 112 forwards the assistance data report to location engine module 114.

Location engine module 114 may be configured to process the data in the assistance data report and generate a configuration report for baseband module 116. The configuration report may include information related to frequencies, acquisition PRN codes, etc. of satellites 106, which are used by baseband module 116 to first track and acquire a satellite and then initiate receiving a measurement report and other navigation messages from the satellite. In operation 212, location engine module 114 sends the configuration and a measurement report request to baseband module 116. Based on the configuration and the request, in operation 214, baseband module 116 may initiate the process of tracking and acquiring a satellite vehicle (SV), e.g., a satellite 106, based on SV tracking-and-acquiring techniques of a typical positioning system (e.g., GPS, GNSS, etc.) that are well-understood by a person of skill in the art. Also in operation 214, baseband module 116 begins receiving satellite timing measurements as well as satellite data such as almanac, ephemeris, corrections etc., from the acquired satellite 106 with which module 116 is communicating, and based on the satellite timing measurements and data, initiates generating a measurement report. As shown, operations 206-214 may constitute a "first time period" of the compute-position session, which basically entails communication with one ("a first") of the sources 104 to obtain the assistance data, and processing that assistance data to initiate communication with one or more satellites 106 for location information.

In some embodiments, at the beginning of a "second time period" of that same compute-position session (i.e., without interrupting or terminating the session), location framework module 112 is able to communicate with an additional source 104 (e.g., source/server 104b) to request and retrieve additional location-related assistance data. The additional source 104 may become available and accessible to location framework module 112 (and in general, to device 102), e.g., when device 102 is disconnected from a first wireless network (having source 104a) and becomes operational to a second wireless network (having source 104b). Such network transition may occur when device 102 is in a cellular roaming mode, and moves from the coverage area of the first network (of a cellular operator) into the coverage area of the second network (of another cellular operator). Additionally, or alternatively, the additional source 104 may become available when device 102, capable of connecting to different types of networks, switches to another network (e.g., a new cellular network based on different technology or the Internet) and is thus able to interface with source/server 104b of the new network.

Accordingly, similar to operations 206, 208, 210, location framework module 112, in operations 216, 218, 220, requests, receives and forwards (to module 114) an assistance data report with location-related assistance data stored at source 104b. At this point in the compute-position session, location engine module 114 may integrate or combine the assistance data from source 104a with the assistance data from source 104b to generate integrated location assistance data/information.

To integrate the assistance data from multiple sources 104, location engine module 114 may be configured to perform operations including, but not limited to, (a) perform a mathematical operation on the reference location information or the reference time information from at least two of the multiple sources (e.g., from sources 104a, 104b); (b) append the ephemeris data/almanac for satellites 106 from one source (104a) with the ephemeris data/almanac from another source (104b); (c) select the assistance received first at device 102 (e.g., from source 104a) as the integrated location information; (d) select the assistance received last at device 102 (e.g., from source 104b) as the integrated location information; (e) convert the ephemeris data or almanac for satellites 106 from a first format to a second format, or vice-versa, wherein the first format corresponds to MSB mode of device 102, and the second format corresponds to MSA mode of device 102. As discussed above, using the integrated assistance data, device 102 may be able to improve its overall performance in determining the requested position in terms of: (a) reduced TTFF, (b) more accurate position information, (c) better sensitivity to acquire satellite signals in "noisy" conditions, and/or (d) acquiring satellite signals and navigation data from additional satellites 106 which otherwise may not been visible to device 102, etc.

Further in operation 222, module 114 updates the configuration based on the integrated assistance data, and provides the updated configuration to baseband module 116. Using the updated configuration, baseband module 116 (in operation 224) updates and improves SV acquiring and tracking (e.g., in terms of time, accuracy and better satellite selection). In operation 226, baseband module 116 receives satellite location messages or data (e.g., including ephemeris, almanac, etc.) and measurement report from the acquired satellites 106. In operation 228, the satellite data and measurement report are provided to module 114.

Further in operation 230 (and still in the same compute-position session), module 114 integrates the satellite location data with the previously-integrated assistance data from multiple sources 104, e.g., in the same manner as discussed above. In operation 230, if device 102 is operating in MSB mode, module 114 computes the position of device 102 based on the newly-integrated location data, or if device 102 is operating in MSA mode, module 114 (or module 112) provides the newly-integrated location data (or only the satellite data) to an external device (e.g., a location computation module or server) to compute the position. The calculated device position is then reported to location framework module 112 (in operation 234), which further provides the position report to the application which requested the position information. Although only two time periods associated with two sources 104 are depicted in FIG. 2 and discussed above, system 100 and process 200 are not limited to these embodiments.

EXAMPLES

The following examples pertain to further embodiments.

Example 1 is a wireless device, comprising a transceiver and a location core module. The transceiver configured to transmit and receive wireless signals. The location core module comprising a processor configured to receive a position request to compute a position of the wireless device, and responsive to the position request, initiate a compute-position session. In the compute-position session, the processor is further configured to (a) send aid requests to a plurality of aid-data sources to retrieve location-related aid information from the plurality of aid-data sources, (b) retrieve the location-related aid information from the plurality of aid-data sources, (c) process the location-related aid information from the plurality of aid-data sources to generate integrated location information, and (d) either compute the position of the wireless device based on the integrated location information and satellite location information received from a satellite, or provide the integrated location information and/or the satellite location information to a location computation module external to the wireless device to compute the position of the wireless device.

In Example 2, the subject matter of Example 1 may optionally include that the location core module includes a location framework module, a location engine module and a location baseband module. The location framework module is configured to receive the position request, and communicate with the plurality of aid-data sources to retrieve the location-related aid information. The location engine module is configured to send a request to the location framework module to communicate with the plurality of aid-data sources to retrieve the location-related aid information, receive the location-related aid information from the location framework module, generate and provide configuration information to the location baseband module, and process the integrated location information and the satellite location information. The location baseband module is configured to track and acquire a satellite based on the configuration information, receive the satellite location information and provide the satellite location information to the location engine module.

In Example 3, the subject matter of Example 2 may optionally include that the location engine module, as part of and without terminating the compute-position session, is further configured to (a) generate and provide first configuration information to the location baseband module based on the location-related aid information received from a first of the plurality of aid-data sources, (b) combine the location-related aid information received from the first of the plurality of aid-data sources with the location-related aid information received from a second of the plurality of aid-data sources, and (c) generate and provide second configuration information to the location baseband module based on the combined location-related aid information.

In Example 4, the subject matter of Example 3 may optionally include that the location baseband module, as part of and without terminating the compute-position session, is further configured to (a) track and acquire a satellite, and initiate generation of a location report based on the first configuration information, and (b) responsive to the second configuration information, update tracking and acquiring of a satellite, and update the location report.

In Example 5, the subject matter of any one of Examples 1-4 may optionally include that, at a first time instance, the wireless device is operationally connected to a first wireless network, and as part of the compute-position session, the processor is configured to retrieve the location-related aid information from a first of the plurality of aid-data sources associated with the first wireless network. Further, in Example 5, at a second time instance, the wireless device is disconnected from the first wireless network and operationally connected to a second wireless network, and as part of and without terminating the compute-position session, the processor is further configured to retrieve the location-related aid information from a second of the plurality of aid-data sources associated with the second wireless network.

In Example 6, the subject matter of any one of Examples 1-5 may optionally include that the plurality of aid-data sources comprises network location servers associated with a plurality of cellular networks, wherein each network location server stores the location-related aid information generated or processed within a corresponding cellular network, one or more Internet-based location service provider servers, or a combination thereof.

In Example 7, the subject matter of any one of Examples 1-6 may optionally include that the location core receives the position request from an application executing on the wireless device, or from a device separate from the wireless device.

In Example 8, the subject matter of any one of Examples 1-7 may optionally include that the location-related aid information comprises reference location information, reference time information, orbital information of a satellite, reference and status information of a set of satellites, or a combination thereof.

In Example 9, the subject matter of Example 8 may optionally include that the processor, to process the location-related aid information, is further configured to (a) perform a mathematical operation on the reference location information or the reference time information from at least two of the plurality of aid-data sources, (b) append the orbital information of a satellite from one of the plurality of aid-data sources with the orbital information of a satellite from another of the plurality of aid-data sources, (c) select the location-related aid information received first at the location core module from one of the plurality of aid-data sources as the integrated location information, (d) select the location-related aid information received last at the location core module from one of the plurality of aid-data sources as the integrated location information, (e) convert the orbital information of a satellite or the reference and status information of a set of satellites from a first format to a second format, or vice-versa, wherein the first format corresponds to computation of the position of the wireless device by the processor of the location core, and the second format corresponds to computation of the position of the wireless device by the location computation module external to the wireless device, or (f) a combination thereof.

Example 10 is a method to compute a position of a wireless device, the method comprising receiving, at a processor associated with the wireless device, a position request to compute a position of the wireless device, and responsive to the position request, initiating, using the processor, a compute-position session. The compute-position session may include (a) sending, using the processor, aid requests to a plurality of aid-data sources to retrieve location-related aid information from the plurality of aid-data sources, (b) receiving, at the processor, the location-related aid information from the plurality of aid-data sources, (c) processing, using the processor, the location-related aid information from the plurality of aid-data sources to generate integrated location information, and (d) either computing, using the processor, the position of the wireless device based on the integrated location information and satellite location information received from a satellite, or provide the integrated location information and/or the satellite location information from the wireless device to a location computation module external to the wireless device to compute the position of the wireless device.

In Example 11, the subject matter of Example 10 may optionally include that the plurality of aid-data sources comprises network location servers associated with a plurality of cellular networks, wherein each network location server stores the location-related aid information generated or processed within a corresponding cellular network, one or more Internet-based location service provider servers, or a combination thereof.

In Example 12, the subject matter any one of Examples 10, 11 may optionally include that the location-related aid information comprises reference location information, reference time information, orbital information of a satellite, reference and status information of a set of satellites, or a combination thereof.

In Example 13, the subject matter of Example 12 may optionally include that said processing the location-related aid information comprises (a) performing a mathematical operation on the reference location information or the reference time information from at least two of the plurality of aid-data sources, (b) appending the orbital information of a satellite from one of the plurality of aid-data sources with the orbital information of a satellite from another of the plurality of aid-data sources, (c) selecting the location-related aid information received first at the location core module from one of the plurality of aid-data sources as the integrated location information, (d) selecting the location-related aid information received last at the location core module from one of the plurality of aid-data sources as the integrated location information, (e) converting the orbital information of a satellite or the reference and status information of a set of satellites from a first format to a second format, or vice-versa, wherein the first format corresponds to computation of the position of the wireless device by the processor of the location core, and the second format corresponds to computation of the position of the wireless device by the location computation module external to the wireless device, or (f) a combination thereof.

Example 14 is a system to compute a position of a wireless device, the system comprising a plurality of aid-data sources storing location-related aid information, a wireless device, and a location computation module. The wireless device is configured to communicate with the plurality of aid-data sources, a data network including the Internet, and a satellite, and includes a transceiver configured to transmit and receive communication signals, and, in response to a position request to compute a position of the wireless device. The wireless device is configured to initiate a compute-position session in which the wireless device sends aid requests to the plurality of aid-data sources to retrieve the location-related aid information from the plurality of aid-data sources, retrieves the location-related aid information from the plurality of aid-data sources, and processes the location-related aid information from the plurality of aid-data sources to generate integrated location information. The location computation module is either integrated within the wireless device, or external to and operationally connected with the wireless device, wherein the location computation module is configured to compute the position of the wireless device based on the integrated location information and satellite location information received from a satellite.

In Example 15, the subject matter of Example 14 may optionally include that the wireless device further comprises a location framework module, a location engine module and a location baseband module. The location framework module is configured to receive the position request, and communicate with the plurality of aid-data sources to retrieve the location-related aid information. The location engine module is configured to send a request to the location framework module to communicate with the plurality of aid-data sources to retrieve the location-related aid information, receive the location-related aid information from the location framework module, generate and provide configuration information to the location baseband module, and process the integrated location information and the satellite location information. The location baseband module is configured to track and acquire a satellite based on the configuration information, receive the satellite location information and provide the satellite location information to the location engine module.

In Example 16, the subject matter of any one of Examples 14, 15 may optionally include that a first wireless network includes a first of the plurality of aid-data sources, and a second wireless network includes a second of the plurality of aid-data sources. At a first time instance, the wireless device is operationally connected to the first wireless network, and as part of the compute-position session, the wireless device retrieves the location-related aid information from the first of the plurality of aid-data sources. And, at a second time instance, the wireless device is disconnected from the first wireless network and operationally connected to the second wireless network, and as part of and without terminating the compute-position session, the wireless device retrieves the location-related aid information from the second of the plurality of aid-data sources, and combines the location-related aid information from the second of the plurality of aid-data sources with the location-related aid information received from the first of the plurality of aid-data sources.

In Example 17, the subject matter of any one of Examples 14-16 may optionally include that the wireless device receives the position request from an application executing on the wireless device, or from a device separate from the wireless device.

In Example 18, the subject matter of any one of Examples 14-17 may optionally include that the plurality of aid-data sources comprises network location servers associated with a plurality of cellular networks, wherein each network location server stores the location-related aid information generated or processed within a corresponding cellular network, one or more Internet-based location service provider servers, or a combination thereof.

In Example 19, the subject matter of any one of Examples 14-18 may optionally include that the location-related aid information comprises reference location information, reference time information, orbital information of a satellite, reference and status information of a set of satellites, or a combination thereof.

In Example 20, the subject matter of Example 19 may optionally include that, to process the location-related aid information, the wireless device is further configured to (a) perform a mathematical operation on the reference location information or the reference time information from at least two of the plurality of aid-data sources, (b) append the orbital information of a satellite from one of the plurality of aid-data sources with the orbital information of a satellite from one or more of the plurality of aid-data sources, (c) select the location-related aid information received first at the wireless device from one of the plurality of aid-data sources as the integrated location information, (d) select the location-related aid information received last at the wireless device from one of the plurality of aid-data sources as the integrated location information, (e) convert the orbital information of a satellite or the reference and status information of a set of satellites from a first format to a second format, or vice-versa, wherein the first format corresponds to computation of the position of the wireless device by the location computation module integrated within the wireless device, and the second format corresponds to computation of the position of the wireless device by the location computation module external to the wireless device, or (f) a combination thereof.

Example 21 is a computer-readable medium comprising computer-readable instructions physically embodied thereon which, when executed by a processor, causes the processor to perform a method to compute a position of a wireless device. Such method includes receiving a position request to compute a position of the wireless device, and responsive to the position request, initiating a compute-position session. The compute-position session includes (a) sending aid requests to a plurality of aid-data sources to retrieve location-related aid information from the plurality of aid-data sources, (b) receiving the location-related aid information from the plurality of aid-data sources, (c) processing the location-related aid information from the plurality of aid-data sources to generate integrated location information, and (d) either computing the position of the wireless device based on the integrated location information and satellite location information received from a satellite, or provide the integrated location information and/or the satellite location information to a location computation module external to the wireless device to compute the position of the wireless device.

In Example 22, the subject matter of Example 21 may optionally include that the plurality of aid-data sources comprises network location servers associated with a plurality of cellular networks, wherein each network location server stores the location-related aid information generated or processed within a corresponding cellular network, one or more Internet-based location service provider servers, or a combination thereof.

In Example 23, the subject matter of any one of Examples 21, 22 may optionally include that the location-related aid information comprises reference location information, reference time information, orbital information of a satellite, reference and status information of a set of satellites, or a combination thereof.

In Example 24, the subject matter of Example 23 may optionally include that said processing the location-related aid information comprises (a) performing a mathematical operation on the reference location information or the reference time information from at least two of the plurality of aid-data sources, (b) appending the orbital information of a satellite from one of the plurality of aid-data sources with the orbital information of a satellite from another of the plurality of aid-data sources, (c) selecting the location-related aid information received first at the location core module from one of the plurality of aid-data sources as the integrated location information, (d) selecting the location-related aid information received last at the location core module from one of the plurality of aid-data sources as the integrated location information, (e) converting the orbital information of a satellite or the reference and status information of a set of satellites from a first format to a second format, or vice-versa, wherein the first format corresponds to computation of the position of the wireless device by the processor of the location core, and the second format corresponds to computation of the position of the wireless device by the location computation module external to the wireless device, or (f) a combination thereof.

Example 25 is a wireless device, comprising a transceiver and a location core module. The transceiver configured to transmit and receive wireless signals. The location core module comprising a processor configured to receive a position request to compute a position of the wireless device, and responsive to the position request, initiate a compute-position session. In the compute-position session, the processor is further configured to (a) send aid requests to a plurality of aid-data sources to retrieve location-related aid information from the plurality of aid-data sources, (b) retrieve the location-related aid information from the plurality of aid-data sources, (c) process the location-related aid information from the plurality of aid-data sources to generate integrated location information, and (d) either compute the position of the wireless device based on the integrated location information and satellite location information received from a satellite, or provide the integrated location information and/or the satellite location information to a location computation module external to the wireless device to compute the position of the wireless device.

In Example 26, the subject matter of Example 25 may optionally include that the location core module includes a location framework module, a location engine module and a location baseband module. The location framework module is configured to receive the position request, and communicate with the plurality of aid-data sources to retrieve the location-related aid information. The location engine module is configured to send a request to the location framework module to communicate with the plurality of aid-data sources to retrieve the location-related aid information, receive the location-related aid information from the location framework module, generate and provide configuration information to the location baseband module, and process the integrated location information and the satellite location information. The location baseband module is configured to track and acquire a satellite based on the configuration information, receive the satellite location information and provide the satellite location information to the location engine module.

In Example 27, the subject matter of Example 26 may optionally include that the location engine module, as part of and without terminating the compute-position session, is further configured to (a) generate and provide first configuration information to the location baseband module based on the location-related aid information received from a first of the plurality of aid-data sources, (b) combine the location-related aid information received from the first of the plurality of aid-data sources with the location-related aid information received from a second of the plurality of aid-data sources, and (c) generate and provide second configuration information to the location baseband module based on the combined location-related aid information.

In Example 28, the subject matter of Example 27 may optionally include that the location baseband module, as part of and without terminating the compute-position session, is further configured to (a) track and acquire a satellite, and initiate generation of a location report based on the first configuration information, and (b) responsive to the second configuration information, update tracking and acquiring of a satellite, and update the location report.

In Example 29, the subject matter of any one of Examples 25-28 may optionally include that, at a first time instance, the wireless device is operationally connected to a first wireless network, and as part of the compute-position session, the processor is configured to retrieve the location-related aid information from a first of the plurality of aid-data sources associated with the first wireless network. Further, in Example 5, at a second time instance, the wireless device is disconnected from the first wireless network and operationally connected to a second wireless network, and as part of and without terminating the compute-position session, the processor is further configured to retrieve the location-related aid information from a second of the plurality of aid-data sources associated with the second wireless network.

In Example 30, the subject matter of any one of Examples 25-29 may optionally include that the plurality of aid-data sources comprises network location servers associated with a plurality of cellular networks, wherein each network location server stores the location-related aid information generated or processed within a corresponding cellular network, one or more Internet-based location service provider servers, or a combination thereof.

In Example 31, the subject matter of any one of Examples 25-30 may optionally include that the location core receives the position request from an application executing on the wireless device, or from a device separate from the wireless device.

In Example 32, the subject matter of any one of Examples 25-31 may optionally include that the location-related aid information comprises reference location information, reference time information, orbital information of a satellite, reference and status information of a set of satellites, or a combination thereof.

In Example 33, the subject matter of Example 32 may optionally include that the processor, to process the location-related aid information, is further configured to (a) perform a mathematical operation on the reference location information or the reference time information from at least two of the plurality of aid-data sources, (b) append the orbital information of a satellite from one of the plurality of aid-data sources with the orbital information of a satellite from another of the plurality of aid-data sources, (c) select the location-related aid information received first at the location core module from one of the plurality of aid-data sources as the integrated location information, (d) select the location-related aid information received last at the location core module from one of the plurality of aid-data sources as the integrated location information, (e) convert the orbital information of a satellite or the reference and status information of a set of satellites from a first format to a second format, or vice-versa, wherein the first format corresponds to computation of the position of the wireless device by the processor of the location core, and the second format corresponds to computation of the position of the wireless device by the location computation module external to the wireless device, or (f) a combination thereof.

Example 34 is a method to compute a position of a wireless device, the method comprising receiving, at a processor associated with the wireless device, a position request to compute a position of the wireless device, and responsive to the position request, initiating, using the processor, a compute-position session. The compute-position session may include (a) sending, using the processor, aid requests to a plurality of aid-data sources to retrieve location-related aid information from the plurality of aid-data sources, (b) receiving, at the processor, the location-related aid information from the plurality of aid-data sources, (c) processing, using the processor, the location-related aid information from the plurality of aid-data sources to generate integrated location information, and (d) either computing, using the processor, the position of the wireless device based on the integrated location information and satellite location information received from a satellite, or provide the integrated location information and/or the satellite location information from the wireless device to a location computation module external to the wireless device to compute the position of the wireless device.

In Example 35, the subject matter of Example 34 may optionally include that the plurality of aid-data sources comprises network location servers associated with a plurality of cellular networks, wherein each network location server stores the location-related aid information generated or processed within a corresponding cellular network, one or more Internet-based location service provider servers, or a combination thereof.

In Example 36, the subject matter any one of Examples 34, 35 may optionally include that the location-related aid information comprises reference location information, reference time information, orbital information of a satellite, reference and status information of a set of satellites, or a combination thereof.

In Example 37, the subject matter of Example 36 may optionally include that said processing the location-related aid information comprises (a) performing a mathematical operation on the reference location information or the reference time information from at least two of the plurality of aid-data sources, (b) appending the orbital information of a satellite from one of the plurality of aid-data sources with the orbital information of a satellite from another of the plurality of aid-data sources, (c) selecting the location-related aid information received first at the location core module from one of the plurality of aid-data sources as the integrated location information, (d) selecting the location-related aid information received last at the location core module from one of the plurality of aid-data sources as the integrated location information, (e) converting the orbital information of a satellite or the reference and status information of a set of satellites from a first format to a second format, or vice-versa, wherein the first format corresponds to computation of the position of the wireless device by the processor of the location core, and the second format corresponds to computation of the position of the wireless device by the location computation module external to the wireless device, or (f) a combination thereof.

Example 38 is a system to compute a position of a wireless device, the system comprising a plurality of aid-data sources each storing location-related aid information, and a wireless device of any one of Examples 25-33.

Example 39 is a computer-readable medium comprising computer-readable instructions physically embodied thereon which, when executed by a processor, causes the processor to perform the method of any one of Examples 34-37.

Example 40 is an apparatus comprising means for performing the method of any one of Examples 34-37.

Example 41 is a wireless device, comprising a transceiver and a location core module. The transceiver configured to transmit and receive wireless signals. The location core module comprising a processor configured to receive a position request to compute a position of the wireless device, and responsive to the position request, initiate a compute-position session. In the compute-position session, the processor is further configured to (a) send aid requests to a plurality of aid-data sources to retrieve location-related aid information from the plurality of aid-data sources, (b) retrieve the location-related aid information from the plurality of aid-data sources, (c) process the location-related aid information from the plurality of aid-data sources to generate integrated location information, and (d) either compute the position of the wireless device based on the integrated location information and satellite location information received from a satellite, or provide the integrated location information and/or the satellite location information to a location computation module external to the wireless device to compute the position of the wireless device.

In Example 42, the subject matter of Example 41 may optionally include that the location core module includes a location framework module, a location engine module and a location baseband module. The location framework module is configured to receive the position request, and communicate with the plurality of aid-data sources to retrieve the location-related aid information. The location engine module is configured to send a request to the location framework module to communicate with the plurality of aid-data sources to retrieve the location-related aid information, receive the location-related aid information from the location framework module, generate and provide configuration information to the location baseband module, and process the integrated location information and the satellite location information. The location baseband module is configured to track and acquire a satellite based on the configuration information, receive the satellite location information and provide the satellite location information to the location engine module.

In Example 43, the subject matter of Example 42 may optionally include that the location engine module, as part of and without terminating the compute-position session, is further configured to (a) generate and provide first configuration information to the location baseband module based on the location-related aid information received from a first of the plurality of aid-data sources, (b) combine the location-related aid information received from the first of the plurality of aid-data sources with the location-related aid information received from a second of the plurality of aid-data sources, and (c) generate and provide second configuration information to the location baseband module based on the combined location-related aid information.

In Example 44, the subject matter of Example 43 may optionally include that the location baseband module, as part of and without terminating the compute-position session, is further configured to (a) track and acquire a satellite, and initiate generation of a location report based on the first configuration information, and (b) responsive to the second configuration information, update tracking and acquiring of a satellite, and update the location report.

In Example 45, the subject matter of any one of Examples 41-44 may optionally include that, at a first time instance, the wireless device is operationally connected to a first wireless network, and as part of the compute-position session, the processor is configured to retrieve the location-related aid information from a first of the plurality of aid-data sources associated with the first wireless network. Further, in Example 5, at a second time instance, the wireless device is disconnected from the first wireless network and operationally connected to a second wireless network, and as part of and without terminating the compute-position session, the processor is further configured to retrieve the location-related aid information from a second of the plurality of aid-data sources associated with the second wireless network.

In Example 46, the subject matter of any one of Examples 41-45 may optionally include that the plurality of aid-data sources comprises network location servers associated with a plurality of cellular networks, wherein each network location server stores the location-related aid information generated or processed within a corresponding cellular network, one or more Internet-based location service provider servers, or a combination thereof.

In Example 47, the subject matter of any one of Examples 41-46 may optionally include that the location core receives the position request from an application executing on the wireless device, or from a device separate from the wireless device.

In Example 48, the subject matter of any one of Examples 41-47 may optionally include that the location-related aid information comprises reference location information, reference time information, orbital information of a satellite, reference and status information of a set of satellites, or a combination thereof.

In Example 49, the subject matter of Example 48 may optionally include that the processor, to process the location-related aid information, is further configured to (a) perform a mathematical operation on the reference location information or the reference time information from at least two of the plurality of aid-data sources, (b) append the orbital information of a satellite from one of the plurality of aid-data sources with the orbital information of a satellite from another of the plurality of aid-data sources, (c) select the location-related aid information received first at the location core module from one of the plurality of aid-data sources as the integrated location information, (d) select the location-related aid information received last at the location core module from one of the plurality of aid-data sources as the integrated location information, (e) convert the orbital information of a satellite or the reference and status information of a set of satellites from a first format to a second format, or vice-versa, wherein the first format corresponds to computation of the position of the wireless device by the processor of the location core, and the second format corresponds to computation of the position of the wireless device by the location computation module external to the wireless device, or (f) a combination thereof.

Example 50 is a method to compute a position of a wireless device, the method comprising receiving, at a processor associated with the wireless device, a position request to compute a position of the wireless device, and responsive to the position request, initiating, using the processor, a compute-position session. The compute-position session may include (a) sending, using the processor, aid requests to a plurality of aid-data sources to retrieve location-related aid information from the plurality of aid-data sources, (b) receiving, at the processor, the location-related aid information from the plurality of aid-data sources, (c) processing, using the processor, the location-related aid information from the plurality of aid-data sources to generate integrated location information, and (d) either computing, using the processor, the position of the wireless device based on the integrated location information and satellite location information received from a satellite, or provide the integrated location information and/or the satellite location information from the wireless device to a location computation module external to the wireless device to compute the position of the wireless device.

In Example 51, the subject matter of Example 50 may optionally include that the plurality of aid-data sources comprises network location servers associated with a plurality of cellular networks, wherein each network location server stores the location-related aid information generated or processed within a corresponding cellular network, one or more Internet-based location service provider servers, or a combination thereof.

In Example 52, the subject matter any one of Examples 50, 51 may optionally include that the location-related aid information comprises reference location information, reference time information, orbital information of a satellite, reference and status information of a set of satellites, or a combination thereof.

In Example 53, the subject matter of Example 52 may optionally include that said processing the location-related aid information comprises (a) performing a mathematical operation on the reference location information or the reference time information from at least two of the plurality of aid-data sources, (b) appending the orbital information of a satellite from one of the plurality of aid-data sources with the orbital information of a satellite from another of the plurality of aid-data sources, (c) selecting the location-related aid information received first at the location core module from one of the plurality of aid-data sources as the integrated location information, (d) selecting the location-related aid information received last at the location core module from one of the plurality of aid-data sources as the integrated location information, (e) converting the orbital information of a satellite or the reference and status information of a set of satellites from a first format to a second format, or vice-versa, wherein the first format corresponds to computation of the position of the wireless device by the processor of the location core, and the second format corresponds to computation of the position of the wireless device by the location computation module external to the wireless device, or (f) a combination thereof.

Example 54 is a system to compute a position of a wireless device, the system comprising a plurality of aid-data sources each storing location-related aid information, and a wireless device of any one of Examples 41-49.

Example 55 is an apparatus comprising means for performing the method of any one of Examples 50-53.

Example 56 is a wireless device, comprising a transceiver and a location core module. The transceiver configured to transmit and receive wireless signals. The location core module comprising a processor configured to receive a position request to compute a position of the wireless device, and responsive to the position request, initiate a compute-position session. In the compute-position session, the processor is further configured to (a) send aid requests to a plurality of aid-data sources to retrieve location-related aid information from the plurality of aid-data sources, (b) retrieve the location-related aid information from the plurality of aid-data sources, (c) process the location-related aid information from the plurality of aid-data sources to generate integrated location information, and (d) either compute the position of the wireless device based on the integrated location information and satellite location information received from a satellite, or provide the integrated location information and/or the satellite location information to a location computation module external to the wireless device to compute the position of the wireless device.

In Example 57, the subject matter of Example 56 may optionally include that the location core module includes a location framework module, a location engine module and a location baseband module. The location framework module is configured to receive the position request, and communicate with the plurality of aid-data sources to retrieve the location-related aid information. The location engine module is configured to send a request to the location framework module to communicate with the plurality of aid-data sources to retrieve the location-related aid information, receive the location-related aid information from the location framework module, generate and provide configuration information to the location baseband module, and process the integrated location information and the satellite location information. The location baseband module is configured to track and acquire a satellite based on the configuration information, receive the satellite location information and provide the satellite location information to the location engine module.

In Example 58, the subject matter of Example 57 may optionally include that the location engine module, as part of and without terminating the compute-position session, is further configured to (a) generate and provide first configuration information to the location baseband module based on the location-related aid information received from a first of the plurality of aid-data sources, (b) combine the location-related aid information received from the first of the plurality of aid-data sources with the location-related aid information received from a second of the plurality of aid-data sources, and (c) generate and provide second configuration information to the location baseband module based on the combined location-related aid information.

In Example 59, the subject matter of Example 58 may optionally include that the location baseband module, as part of and without terminating the compute-position session, is further configured to (a) track and acquire a satellite, and initiate generation of a location report based on the first configuration information, and (b) responsive to the second configuration information, update tracking and acquiring of a satellite, and update the location report.

In Example 60, the subject matter of any one of Examples 56-59 may optionally include that, at a first time instance, the wireless device is operationally connected to a first wireless network, and as part of the compute-position session, the processor is configured to retrieve the location-related aid information from a first of the plurality of aid-data sources associated with the first wireless network. Further, in Example 5, at a second time instance, the wireless device is disconnected from the first wireless network and operationally connected to a second wireless network, and as part of and without terminating the compute-position session, the processor is further configured to retrieve the location-related aid information from a second of the plurality of aid-data sources associated with the second wireless network.

In Example 61, the subject matter of any one of Examples 56-60 may optionally include that the plurality of aid-data sources comprises network location servers associated with a plurality of cellular networks, wherein each network location server stores the location-related aid information generated or processed within a corresponding cellular network, one or more Internet-based location service provider servers, or a combination thereof.

In Example 62, the subject matter of any one of Examples 56-61 may optionally include that the location core receives the position request from an application executing on the wireless device, or from a device separate from the wireless device.

In Example 63, the subject matter of any one of Examples 56-62 may optionally include that the location-related aid information comprises reference location information, reference time information, orbital information of a satellite, reference and status information of a set of satellites, or a combination thereof.

In Example 64, the subject matter of Example 63 may optionally include that the processor, to process the location-related aid information, is further configured to (a) perform a mathematical operation on the reference location information or the reference time information from at least two of the plurality of aid-data sources, (b) append the orbital information of a satellite from one of the plurality of aid-data sources with the orbital information of a satellite from another of the plurality of aid-data sources, (c) select the location-related aid information received first at the location core module from one of the plurality of aid-data sources as the integrated location information, (d) select the location-related aid information received last at the location core module from one of the plurality of aid-data sources as the integrated location information, (e) convert the orbital information of a satellite or the reference and status information of a set of satellites from a first format to a second format, or vice-versa, wherein the first format corresponds to computation of the position of the wireless device by the processor of the location core, and the second format corresponds to computation of the position of the wireless device by the location computation module external to the wireless device, or (f) a combination thereof.

Example 65 is a method to compute a position of a wireless device, the method comprising receiving, at a processor associated with the wireless device, a position request to compute a position of the wireless device, and responsive to the position request, initiating, using the processor, a compute-position session. The compute-position session may include (a) sending, using the processor, aid requests to a plurality of aid-data sources to retrieve location-related aid information from the plurality of aid-data sources, (b) receiving, at the processor, the location-related aid information from the plurality of aid-data sources, (c) processing, using the processor, the location-related aid information from the plurality of aid-data sources to generate integrated location information, and (d) either computing, using the processor, the position of the wireless device based on the integrated location information and satellite location information received from a satellite, or provide the integrated location information and/or the satellite location information from the wireless device to a location computation module external to the wireless device to compute the position of the wireless device.

In Example 66, the subject matter of Example 65 may optionally include that the plurality of aid-data sources comprises network location servers associated with a plurality of cellular networks, wherein each network location server stores the location-related aid information generated or processed within a corresponding cellular network, one or more Internet-based location service provider servers, or a combination thereof.

In Example 67, the subject matter any one of Examples 65, 66 may optionally include that the location-related aid information comprises reference location information, reference time information, orbital information of a satellite, reference and status information of a set of satellites, or a combination thereof.

In Example 68, the subject matter of Example 67 may optionally include that said processing the location-related aid information comprises (a) performing a mathematical operation on the reference location information or the reference time information from at least two of the plurality of aid-data sources, (b) appending the orbital information of a satellite from one of the plurality of aid-data sources with the orbital information of a satellite from another of the plurality of aid-data sources, (c) selecting the location-related aid information received first at the location core module from one of the plurality of aid-data sources as the integrated location information, (d) selecting the location-related aid information received last at the location core module from one of the plurality of aid-data sources as the integrated location information, (e) converting the orbital information of a satellite or the reference and status information of a set of satellites from a first format to a second format, or vice-versa, wherein the first format corresponds to computation of the position of the wireless device by the processor of the location core, and the second format corresponds to computation of the position of the wireless device by the location computation module external to the wireless device, or (f) a combination thereof.

Example 69 is a computer-readable medium comprising computer-readable instructions physically embodied thereon to implement, when executed, the wireless device of any one of Examples 56-64 or the method of any one of Examples 65-68.

Example 70 is an apparatus comprising means for performing the method of any one of Examples 65-68.

Having thus described the basic concepts, it will be rather apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure. In addition, the terms "logic" and "module" are representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

Furthermore, the recited order of processing elements or sequences, or the use of numbers, letters, or other designations therefore, is not intended to limit the claimed processes and methods to any order except as can be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, as the following claims reflect, inventive embodiments lie in less than all features of a single foregoing disclosed embodiment. Thus, the claims following the detailed description are hereby expressly incorporated into this detailed description.

What is claimed is:

1. A wireless device, comprising:
a transceiver configured to transmit and receive wireless signals; and
a location core module comprising a processor configured to:
receive a position request to compute a position of the wireless device, and
responsive to the position request, initiate a compute-position session in which the processor is further configured to:
send aid requests for location-related aid information,
receive the location-related aid information, wherein the location-related aid information comprises satellite orbital information, and/or satellite-related reference and status information,
process the location-related aid information to generate integrated location information, track and acquire a satellite based on the integrated location information, and either compute the position of the wireless device based on the integrated location information and satellite location information received from the satellite, or provide the integrated location information and/or the satellite location information to a location computation module external to the wireless device to compute the position of the wireless device.

2. The wireless device of claim 1, wherein the location core module further comprises a location framework module, a location engine module and a location baseband module, wherein, using the processor:

the location framework module is configured to receive the position request, and communicate with a plurality of aid-data sources to receive the location-related aid information;

the location engine module is configured to:
send a request to the location framework module to communicate with the plurality of aid-data sources to receive the location-related aid information,
receive the location-related aid information from the location framework module,
generate and provide configuration information to the location baseband module, and
process the integrated location information and the satellite location information; and the location baseband module is configured to track and acquire the satellite based on the configuration information, receive the satellite location information and provide the satellite location information to the location engine module.

3. The wireless device of claim 1, wherein the processor is further configured to send the aid requests to a plurality of aid-data sources to receive the location-related aid information from the plurality of aid-data sources, wherein the plurality of aid-data sources comprises network location servers associated with a plurality of cellular networks, wherein each network location server stores the location-related aid information generated or processed within a corresponding cellular network, one or more Internet-based location service provider servers, or a combination thereof.

4. The wireless device of claim 1, wherein the location-related aid information further comprises reference location information, reference time information, or a combination thereof.

5. The wireless device of claim 4, wherein, to process the location-related aid information, the processor is further configured to:

perform a mathematical operation on the reference location information or the reference time information from at least two of a plurality of aid-data sources, append the satellite orbital information from one of the plurality of aid-data sources with the satellite orbital information from another of the plurality of aid-data sources, select the location-related aid information received first at the location core module from one of the plurality of aid-data sources as the integrated location information, select the location-related aid information received last at the location core module from one of the plurality of aid-data sources as the integrated location information, convert the satellite orbital information or the satellite-related reference and status information from a first format to a second format, or vice-versa, wherein the first format corresponds to computation of the position of the wireless device by the processor of the location core, and the second format corresponds to computation of the position of the wireless device by the location computation module external to the wireless device, or a combination thereof.

6. The wireless device of claim 1, wherein the location core receives the position request from an application executing on the wireless device, or from a device separate from the wireless device.

7. The wireless device of claim 2, wherein, as part of and without terminating the compute-position session, the location engine module is further configured to:

generate and provide first configuration information to the location baseband module based on the location-related aid information received from a first of the plurality of aid-data sources;

combine the location-related aid information received from the first of the plurality of aid-data sources with the location-related aid information received from a second of the plurality of aid-data sources; and generate and provide second configuration information to the location baseband module based on the combined location-related aid information.

8. The wireless device of claim 7, wherein, as part of and without terminating the compute-position session, the location baseband module is further configured to:

track and acquire the satellite, and initiate generation of a location report based on the first configuration information; and responsive to the second configuration information, update tracking and acquiring of the satellite, and update the location report.

9. The wireless device of claim 1, wherein:

at a first time instance, the wireless device is operationally connected to a first wireless network, and as part of the compute-position session, the processor is configured to receive the location-related aid information from a first of a plurality of aid-data sources associated with the first wireless network; and at a second time instance, the wireless device is disconnected from the first wireless network and operationally connected to a second wireless network, and as part of and without terminating the compute-position session, the processor is further configured to receive the location-related aid information from a second of the plurality of aid-data sources associated with the second wireless network.

10. A method to compute a position of a wireless device, the method comprising:

receiving, at a processor associated with the wireless device, a position request to compute a position of the wireless device; and responsive to the position request, initiating, using the processor, a compute-position session, the compute-position session comprising:

sending, using the processor, aid requests for location-related aid information, receiving, at the processor, the location-related aid information comprising satellite orbital information, and/or satellite-related reference and status information, processing, using the processor, the location-related aid information to generate integrated location information, tracking and acquiring a satellite based on the integrated location information, and either computing, using the processor, the position of the wireless device based on the integrated location information and satellite location information received from the satellite, or providing the integrated location information and/or the satellite location information from the wireless device to a location computation module external to the wireless device to compute the position of the wireless device.

11. The method of claim 10, said sending the aid requests comprises sending the aid requests to a plurality of aid-data sources to receive the location-related aid information from the plurality of aid-data sources, and said receiving comprises receiving the location-related aid information from the plurality of aid-data sources, wherein the plurality of aid-data sources comprises network location servers associated with a plurality of cellular networks, wherein each network location server stores the location-related aid information generated or processed within a corresponding cellular network, one or more Internet-based location service provider servers, or a combination thereof.

12. The method of claim 10, wherein the location-related aid information further comprises reference location information, reference time information, or a combination thereof.

13. The method of claim 12, wherein, said processing the location-related aid information comprises:
performing a mathematical operation on the reference location information or the reference time information from at least two of a plurality of aid-data sources,
appending the satellite orbital information from one of the plurality of aid-data sources with the satellite orbital information from another of the plurality of aid-data sources,
selecting the location-related aid information received first at the location core module from one of the plurality of aid-data sources as the integrated location information,
selecting the location-related aid information received last at the location core module from one of the plurality of aid-data sources as the integrated location information,
converting the satellite orbital information or the satellite-related reference and status information from a first format to a second format, or vice-versa, wherein the first format corresponds to computation of the position of the wireless device by the processor of the location core, and the second format corresponds to computation of the position of the wireless device by the location computation module external to the wireless device, or
a combination thereof.

14. A system to compute a position of a wireless device, the system comprising:
a plurality of aid-data sources each storing location-related aid information;
a wireless device configured to communicate with the plurality of aid-data sources, a data network including the Internet, and a satellite, the wireless device comprising a transceiver configured to transmit and receive communication signals, and, in response to a position request to compute a position of the wireless device, the wireless device is configured to:
initiate a compute-position session, in which compute-position session, the wireless device:
sends aid requests to the plurality of aid-data sources to retrieve the location-related aid information from the plurality of aid-data sources,
receives the location-related aid information from the plurality of aid-data sources, wherein the location-related aid information comprises satellite orbital information, and/or satellite-related reference and status information,
processes the location-related aid information from the plurality of aid-data sources to generate integrated location information, and
tracks and acquires a satellite based on the integrated location information; and
a location computation module either integrated within the wireless device, or external to and operationally connected with the wireless device, wherein the location computation module is configured to compute the position of the wireless device based on the integrated location information and satellite location information received from the satellite.

15. The system of claim 14, wherein the plurality of aid-data sources comprises network location servers associated with a plurality of cellular networks, wherein each network location server stores the location-related aid information generated or processed within a corresponding cellular network, one or more Internet-based location service provider servers, or a combination thereof.

16. The system of claim 14, wherein the location-related aid information further comprises reference location information, reference time information, or a combination thereof.

17. The system of claim 16, wherein, to process the location-related aid information, the wireless device is further configured to:
perform a mathematical operation on the reference location information or the reference time information from at least two of the plurality of aid-data sources,
append the satellite orbital information from one of the plurality of aid-data sources with the satellite orbital information from another of the plurality of aid-data sources,
select the location-related aid information received first at the wireless device from one of the plurality of aid-data sources as the integrated location information,
select the location-related aid information received last at the wireless device from one of the plurality of aid-data sources as the integrated location information,
convert the satellite orbital information or the satellite-related reference and status information from a first format to a second format, or vice-versa, wherein the first format corresponds to computation of the position of the wireless device by the location computation module integrated within the wireless device, and the second format corresponds to computation of the position of the wireless device by the location computation module external to the wireless device, or
a combination thereof.

18. The system of claim 14, wherein the wireless device receives the position request from an application executing on the wireless device, or from a device separate from the wireless device.

19. The system of claim 14, wherein the wireless device further comprises a location framework module, a location engine module and a location baseband module, wherein:
the location framework module is configured to receive the position request, and communicate with the plurality of aid-data sources to receive the location-related aid information;
the location engine module is configured to:
send a request to the location framework module to communicate with the plurality of aid-data sources to receive the location-related aid information,
receive the location-related aid information from the location framework module,
generate and provide configuration information to the location baseband module, and process the integrated location information and the satellite location information; and the location baseband module is configured to track and acquire the satellite based on the configuration information, receive the satellite location information and provide the satellite location information to the location engine module.

20. The system of claim 14, further comprising a first wireless network comprising a first of the plurality of aid-data sources, and a second wireless network comprising a second of the plurality of aid-data sources, wherein:

at a first time instance, the wireless device is operationally connected to the first wireless network, and as part of the compute-position session, the wireless devices retrieves the location-related aid information from the first of the plurality of aid-data sources;

at a second time instance, the wireless device is disconnected from the first wireless network and operationally connected to the second wireless network, and as part of and without terminating the compute-position session, the wireless device retrieves the location-related aid information from the second of the plurality of aid-data sources, and combines the location-related aid information from the second of the plurality of aid-data sources with the location-related aid information received from the first of the plurality of aid-data sources.

21. A non-transitory computer-readable medium comprising computer-readable instructions physically embodied thereon which, when executed by a processor, causes the processor to perform a method to compute a position of a wireless device, the method comprising:

receiving a position request to compute a position of the wireless device; and responsive to the position request, initiating a compute-position session, the compute-position session comprising:

sending aid requests for location-related aid information, receiving the location-related aid information, wherein the location-related aid information comprises satellite orbital information, and/or satellite-related reference and status information, processing the location-related aid information to generate integrated location information, tracking and acquiring a satellite based on the integrated location information, and either computing the position of the wireless device based on the integrated location information and satellite location information received from the satellite, or providing the integrated location information and/or the satellite location information to a location computation module external to the wireless device to compute the position of the wireless device.

22. The computer-readable medium of claim 21, wherein said sending comprises sending the aid requests to a plurality of aid-data sources to receive the location-related aid information from the plurality of aid-data sources, and said receiving comprises receiving the location-related aid information from the plurality of aid-data sources, wherein the plurality of aid-data sources comprises network location servers associated with a plurality of cellular networks, wherein each network location server stores the location-related aid information generated or processed within a corresponding cellular network, one or more Internet-based location service provider servers, or a combination thereof.

23. The computer-readable medium of claim 21, wherein the location-related aid information further comprises reference location information, reference time information, or a combination thereof.

24. The computer-readable medium of claim 23, wherein said processing the location-related aid information comprises:

performing a mathematical operation on the reference location information or the reference time information from at least two of a plurality of aid-data sources, appending the satellite orbital information from one of the plurality of aid-data sources with the satellite orbital information from another of the plurality of aid-data sources, selecting the location-related aid information received first at the location core module from one of the plurality of aid-data sources as the integrated location information, selecting the location-related aid information received last at the location core module from one of the plurality of aid-data sources as the integrated location information, converting the satellite orbital information or the satellite-related reference and status information from a first format to a second format, or vice-versa, wherein the first format corresponds to computation of the position of the wireless device by the processor of the location core, and the second format corresponds to computation of the position of the wireless device by the location computation module external to the wireless device, or a combination thereof.

* * * * *